Aug. 12, 1947.       H. W. WASHBURN       2,425,407
GALVANOMETER
Filed Dec. 9, 1943       2 Sheets-Sheet 1
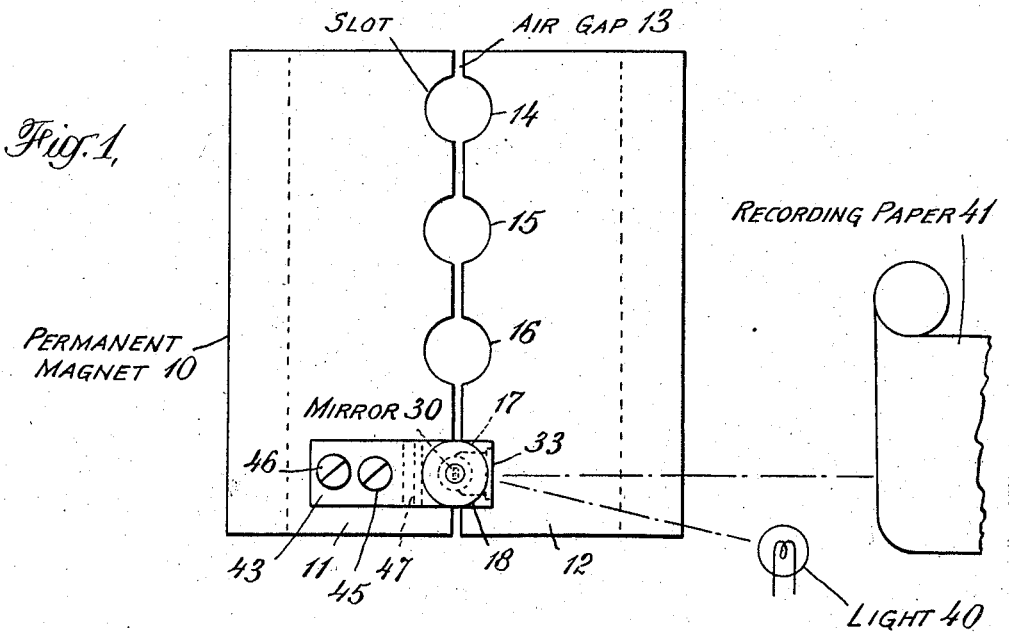
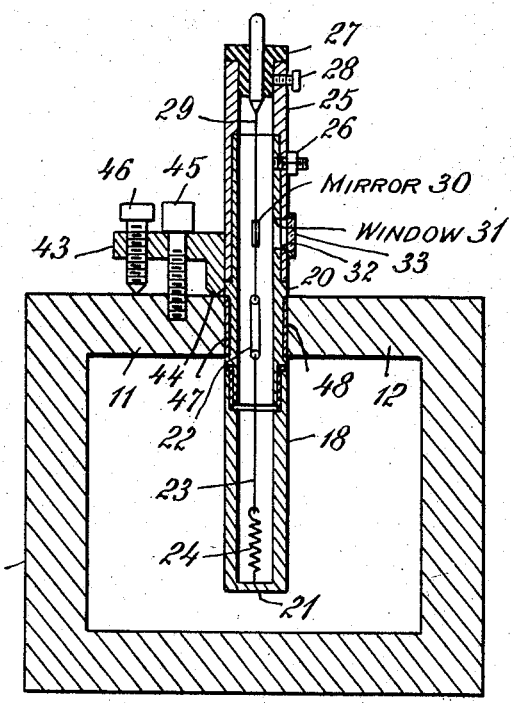
INVENTOR.
HAROLD W. WASHBURN
BY
ATTORNEYS.

Aug. 12, 1947.  H. W. WASHBURN  2,425,407
GALVANOMETER
Filed Dec. 9, 1943    2 Sheets-Sheet 2
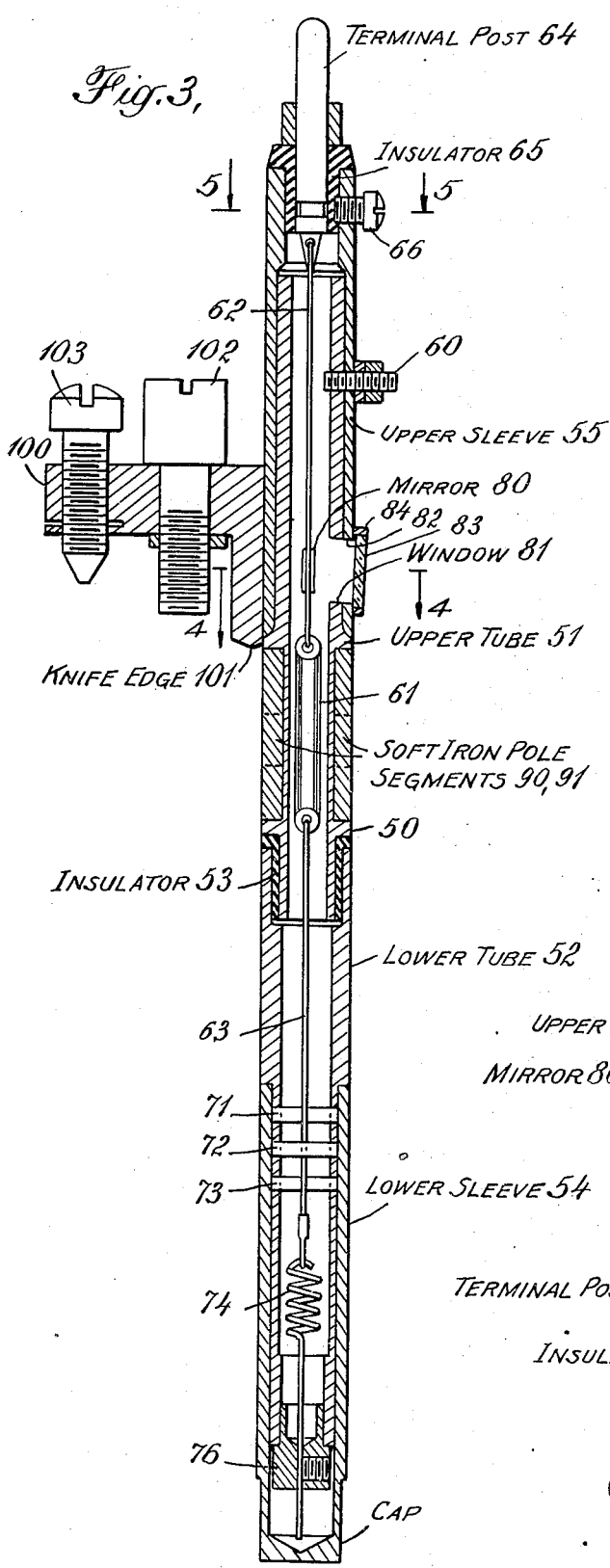
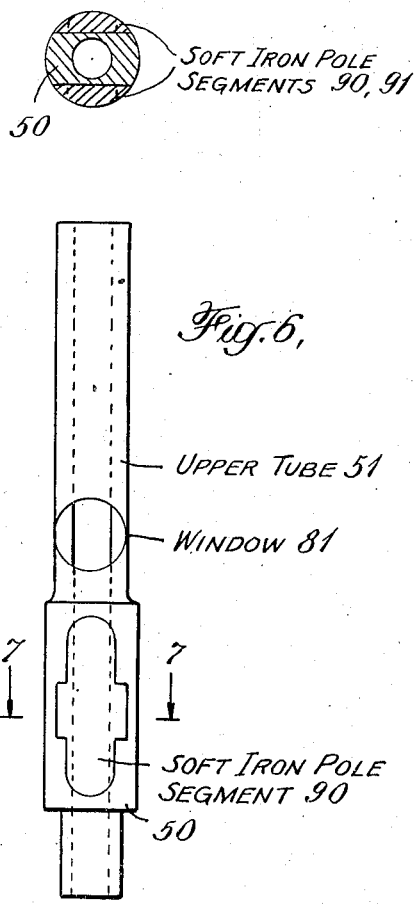
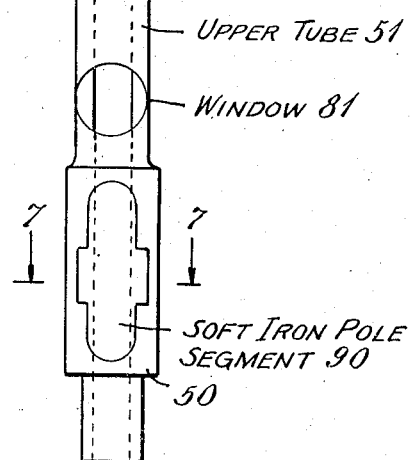
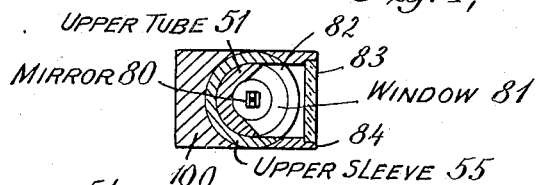
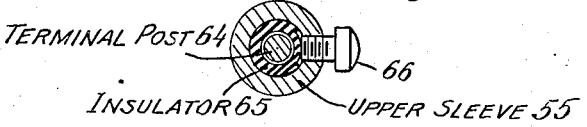
INVENTOR.
HAROLD W. WASHBURN
ATTORNEYS

Patented Aug. 12, 1947

2,425,407

UNITED STATES PATENT OFFICE 2,425,407

GALVANOMETER

Harold W. Washburn, Pasadena, Calif., assignor to Consolidated Engineering Corporation, Pasadena, Calif., a corporation of California Application December 9, 1943, Serial No. 513,530

6 Claims. (Cl. 171—95)

This invention is concerned with galvanometers and particularly with galvanometers which have an elongated cylindrical or tubular coil assembly adapted to be inserted in a gap between the poles of a permanent magnet. Thus the invention finds application in the construction of multi-element oscillographs in which a plurality of elongated cylindrical galvanometer coil assemblies are inserted in a series of gaps between the pole pieces of a permanent magnet. The galvanometer assemblies of the invention have an improved linearity of response, i. e. throughout the range of operation the ratio of galvanometer deflection to galvanometer coil current is more nearly constant than with galvanometers of this general type heretofore available.

In accordance with my invention, the improvement in linearity of response is achieved through the combination of means for adjusting the distribution or shape of the magnetic field in which the galvanometer coil is disposed with means for adjusting the zero of the galvanometer independently of the adjustment of the magnetic field. Thus my invention contemplates in a galvanometer coil assembly adapted to be disposed between the poles of a magnet, the combination which comprises a tubular support or barrel, a galvanometer coil rotatable on the axis of the barrel and mounted within it, a soft iron segment mounted opposite the galvanometer coil and preferably on the barrel, means for adjusting the zero rotational position of the coil with respect to the barrel, and means for rotatably adjusting the soft iron segment between the poles.

The soft iron segment which, together with the galvanometer coil, is positioned between the poles of a permanent magnet, or the like, may be employed to adjust the shape or distribution of the field created by the permanent magnet. Thus the galvanometer assembly may be supported on the permanent magnet by a bracket mounted on a sleeve within which the barrel turns, so that the barrel (within which the coil is disposed) may be rotated with respect to the magnet. In this fashion the soft iron segment is rotated between the pole pieces.

These and other features of my invention will be more thoroughly understood in the light of the following detailed description, taken in conjunction with the accompanying drawing, in which:

Fig. 1 is a diagrammatic plan showing a multi-element galvanometer in which a plurality of tubular galvanometer coil assemblies may be mounted in grooves or slots between the poles of a single permanent magnet;

Fig. 2 is a diagrammatic sectional elevation through the apparatus of Fig. 1 showing a simplified form of the galvanometer coil assembly of my invention disposed in the permanent magnet;

Fig. 3 is a sectional elevation through a preferred form of the galvanometer coil assembly of my invention;

Fig. 4 is a section through the apparatus of Fig. 3 taken along the line 4—4;

Fig. 5 is a section of the apparatus of Fig. 3 taken along the line 5—5;

Fig. 6 is a detailed view of the upper part of the tubular support of the apparatus of Fig. 3, showing a soft iron segment inserted in the wall of the tube; and Fig. 7 is a section through the member of Fig. 6 taken along the line 7—7.

Referring now to the drawings and particularly to Figs. 1 and 2, it will be observed that the apparatus comprises a permanent magnet 10, provided with opposing pole pieces 11, 12, which define a gap 13. The gap is provided with a plurality of vertical cylindrical slots 14, 15, 16, 17 within any one of which an elongated cylindrical galvanometer coil assembly 18 may be disposed.

The galvanometer coil assembly comprises a tubular support member or barrel 20 of a non-magnetic material having a lower closed end 21. A galvanometer coil 22 is mounted within the tubular support at an elevation such that it will lie between the pole pieces of the permanent magnet when the assembly is inserted therein. The axis of the galvanometer coil is substantially perpendicular to the axis of the barrel and the axis of the barrel is transverse to a line, say a line of force, connecting the two pole pieces. One side of the galvanometer coil is fastened to the closed end of the barrel by a lower suspension fiber 23 through a coil spring 24.

A rotatably adjustable sleeve 25 is fitted over the upper end of the barrel. Its rotatable position with respect to the barrel may be changed by loosening the lock screw 26 that passes through a slot in the sleeve and is threaded into the barrel wall. The upper end of the sleeve carries a coil-adjusting member 27, which may be rotated in relation to the sleeve (and to the barrel) and locked in fixed position to the sleeve with a lock screw 28, which is threaded into the wall of the sleeve. The upper side of the galvanometer coil is fastened to the coil-adjusting member 27 by an upper suspension fiber 29. This fiber has cemented thereto a mirror 30. In the wall of the barrel opposite the mirror there is a window or opening 31. A matching window or opening 32 covered by a glass plate 33 is provided in the side of the sleeve. A light beam from a source 40 (see Fig. 1) is directed through the window to the mirror and is reflected back to fall upon a recording medium 41, for example a light sensitive paper, as in conventional recording oscillographs, so that application of an electric current to the coil will cause it to rotate with respect to the magnet and so shift the light beam on the recording medium.

A bracket 43 is fastened rigidly to the sleeve of the galvanometer assembly and this bracket may be mounted on the permanent magnet. Thus the bracket may be provided with a knife edge 44, a supporting screw 45 screwed into the permanent magnet and a pointed adjusting screw 46.

In the wall of the barrel at the level of the coil and the pole pieces there are a pair of soft iron inserts or segments 47, 48. When the galvanometer assembly is mounted in the magnet, the barrel may be rotated slightly between the pole pieces thus shifting the position of the soft iron inserts with respect to the pole pieces and altering the shape or the distribution of the magnetic field between the pole pieces. By adjusting the distribution of this magnetic field an improvement in the linearity of response to the galvanometer can be obtained. At the same time, the zero position of the galvanometer coil (i. e. the angle which the coil makes with the barrel axis under "no current" conditions) may be adjusted by rotating the member 27 with respect to the sleeve. Hence the zero adjustment of the galvanometer coil may be made independently of the adjustment of the field distribution.

A preferred form of the galvanometer coil assembly of my invention is illustrated by Figs. 3 to 7 inclusive. Referring now to these figures and particularly to Fig. 3, it will be observed that the galvanometer coil assembly comprises a tubular support or barrel 50 of a non-magnetic material composed of an upper tubular section 51 and a lower tubular section 52 joined together end to end with a tubular insulator 53. A lower sleeve 54 is fitted over the lower end of the barrel.

An upper sleeve 55 is fitted over the upper end of the barrel. This upper sleeve is axially adjustable (i. e. rotatable with respect to the barrel) to a limited degree. The maximum rotation of the upper sleeve with respect to the barrel is about 10° and is controlled by a set screw 60 that passes through a slot in the upper sleeve and is threaded into the upper tubular section of the barrel.

A galvanometer coil 61 is disposed within the barrel adjacent the lower end of the upper tubular section with its axis perpendicular to the axis of the barrel. The coil is suspended in this position by suspension fibers 62, 63.

The upper suspension fiber 62 is connected to a terminal post 64 that is rigidly supported in an insulator 65 fastened in the end of the upper sleeve and axially (i. e. rotatably) adjustable with respect to the sleeve, the position of the insulator and hence of the terminal post with respect to the sleeve being controlled by a set screw 66 that is threaded through the side of the sleeve.

The lower suspension fibre 63 passes over suspension pins 71, 72, 73 which are supported crosswise within the lower tubular section of the barrel. The lower end of the suspension fiber 63 is attached to a coil spring 74 which is secured to a plug 76 that is fastened rigidly in the bottom of the barrel.

A mirror 80 is cemented to the upper suspension fiber just above the galvanometer coil and opposite a window 81 in the barrel which matches a window 82 in the enveloping sleeve. A glass plate 83 in a window frame 84 closes the window in the sleeve. As described hereinbefore, a light beam from an appropriate source enters the barrel through the window, strikes the mirror and is reflected to a record, for example, a laterally moving photographic film.

In the wall of the barrel (and specifically in the wall of the upper tubular portion of the barrel adjacent the galvanometer coil) there are soft iron segments 90, 91 which function as described hereinbefore with respect to the apparatus of Figs. 1 and 2. Briefly, the soft iron segments serve to concentrate magnetic flux at the coil position and may be employed to alter the distribution of the field in this zone.

The galvanometer coil assembly may be mounted in the cylindrical groove between the poles of a permanent magnet (as in Fig. 1) and there supported by a bracket 100. This bracket is fastened rigidly to the upper sleeve of the assembly and has a knife edge 101 adjacent the barrel. The bracket is provided with a screw 102 for securing it to the permanent magnet while another screw 103 with a pointed tip is positioned at the end of the bracket remote from the galvanometer barrel and may be used to hold the galvanometer firmly in the position determined by the knife edge and the screw 102.

It will be noted that the galvanometer barrel and the attached lower sleeve form a single cylindrical tubular section which is axially adjustable in the cylindrical slot between the poles of the permanent magnet, so that the position of the soft iron segments relative to the permanent magnet may be adjusted. Once the soft iron pole tips are adjusted to a position such that a substantially constant proportionality exists between galvanometer deflection or reading and galvanometer coil current, the zero position of the galvanometer mirror may be adjusted by twisting the terminal post, to which the upper suspension fiber carrying the galvanometer mirror or indicator is secured.

I claim:

1. In a galvanometer, the combination which comprises a magnet, a tubular barrel mounted between the poles of the magnet with its axis transverse to a line connecting the poles, a galvanometer coil mounted within the barrel between the poles and rotatable on the axis of the barrel, a soft iron segment mounted adjacent the coil between the pole pieces and adjustably movable around the axis of the barrel, means projecting outside the galvanometer for so adjusting the segment, and means for adjusting the zero position of the coil with respect to the barrel.

2. In a galvanometer, the combination which comprises a magnet, a tubular barrel mounted between the poles of the magnet with its axis transverse to a line connecting the poles, a supporting sleeve within which the barrel is rotatably mounted on the magnet, a galvanometer coil mounted within the barrel between the poles and rotatable on the axis of the barrel and with respect to the barrel, a soft iron segment mounted on the barrel, adjacent the coil between the pole pieces and adjustably movable around the axis of the barrel, means accessible from the exterior of the galvanometer for so adjusting the segment, and means for adjusting the zero position of the coil with respect to the barrel.

3. In a galvanometer, the combination which comprises a magnet, a tubular barrel mounted between the poles of the magnet with its axis transverse to a line connecting the poles, a galvanometer coil mounted within the barrel between the poles and rotatable with respect to the barrel on the axis thereof, a soft iron segment mounted on the barrel adjacent the coil between the pole pieces, a supporting member attached to the magnet and holding the barrel so that it is rotatable on its axis with respect to the pole pieces, means projecting through a wall of the supporting member for so rotating the barrel, and means for adjusting the zero position of the coil with respect to the barrel.

4. In a galvanometer, the combination which comprises a magnet, a tubular barrel mounted between the poles of the magnet with its axis transverse to a line connecting the poles, a galvanometer coil mounted within the barrel between the poles and rotatable with respect to the barrel on the axis thereof, a soft iron segment mounted on the barrel adjacent the coil between the pole pieces, a sleeve within which the barrel is rotatable on its axis mounted on the magnet, means projecting through the sleeve for clamping the sleeve to the barrel, and means for adjusting the zero position of the coil with respect to the barrel mounted on the sleeve.

5. In a galvanometer, the combination which comprises a magnet, a tubular barrel mounted between the poles of the magnet with its axis transverse to a line connecting the poles, a galvanometer coil mounted within the barrel between the poles and rotatable with respect to the barrel on the axis thereof, a soft iron segment mounted on the barrel adjacent the coil between the pole pieces, a sleeve fastened to the magnet and within which the barrel is rotatable on the axis, means projecting through the sleeve for clamping it to the barrel, and means for adjusting the zero position of the coil with respect to the barrel, comprising a rotatable member mounted on the sleeve and connected to the coil.

6. In a galvanometer, the combination which comprises a magnet, a tubular barrel disposed between the poles of the magnet with its axis transverse to a line connecting the poles and rotatable on said axis, a galvanometer coil rotatable on the axis of the barrel and mounted within it between the poles, a soft iron segment mounted on the barrel between the poles, a sleeve fastened to the magnet and supporting the barrel in its rotatable condition, means projecting through a wall of the sleeve for clamping it to the barrel and a supporting member mounted on the sleeve and connected to the coil and rotatable with respect to the sleeve and the barrel on the axis of the barrel.

HAROLD W. WASHBURN.

REFERENCES CITED

The following references are of record in the file of this patent:

UNITED STATES PATENTS

| Number | Name | Date |
| --- | --- | --- |
| 1,742,970 | Robinson | Jan. 7, 1930 |
| 1,951,578 | Peters | Mar. 20, 1934 |
| 2,149,442 | Kannenstine | Mar. 7, 1939 |
| 2,268,526 | Palmer | Dec. 30, 1941 |
| 2,389,081 | Redmond | Nov. 13, 1945 |